(12) United States Patent
Westfall et al.

(10) Patent No.: US 10,933,793 B2
(45) Date of Patent: Mar. 2, 2021

(54) DELIVERY LOCKER AND ASSEMBLIES

(71) Applicant: Ford Global Technologies, LLC, Dearborn, MI (US)

(72) Inventors: Christopher Westfall, San Francisco, CA (US); Juliette Seive, Allen, TX (US)

(73) Assignee: Ford Global Technologies, LLC, Dearborn, MI (US)

( * ) Notice: Subject to any disclaimer, the term of this patent is extended or adjusted under 35 U.S.C. 154(b) by 247 days.

(21) Appl. No.: 16/167,342

(22) Filed: Oct. 22, 2018

(65) Prior Publication Data

US 2020/0122626 A1 Apr. 23, 2020

(51) Int. Cl.
*B60P 3/00* (2006.01)
*G07F 17/00* (2006.01)
*B60P 1/64* (2006.01)
*G05D 1/02* (2020.01)
*B65G 1/137* (2006.01)

(52) U.S. Cl.
CPC .............. *B60P 3/007* (2013.01); *B60P 1/6481* (2013.01); *B65G 1/1375* (2013.01); *G05D 1/0223* (2013.01); *G05D 2201/0213* (2013.01)

(58) Field of Classification Search
CPC .......... B60P 1/6481; B60P 3/007; B60P 7/06; B60P 7/10; G07F 17/10; G07F 17/105; G07F 17/12; G07F 17/13; G07F 17/14
See application file for complete search history.

(56) References Cited

U.S. PATENT DOCUMENTS

| | | | | |
|---|---|---|---|---|
| 2001/0045449 A1* | 11/2001 | Shannon | .................. | G07C 9/21 232/19 |
| 2002/0087429 A1* | 7/2002 | Shuster | .................. | G06Q 10/08 340/5.73 |
| 2004/0004419 A1* | 1/2004 | Godlewski | ............. | A47B 63/06 312/297 |
| 2008/0315737 A1* | 12/2008 | Hammond | ............. | B25H 3/023 312/242 |
| 2016/0235236 A1* | 8/2016 | Byers | .................... | A47G 29/141 |
| 2018/0170675 A1 | 6/2018 | High et al. | | |
| 2018/0203464 A1 | 7/2018 | Yu et al. | | |
| 2018/0352987 A1* | 12/2018 | Kutas | .................. | A47G 29/1214 |
| 2019/0047460 A1* | 2/2019 | Goldberg | .................. | G07F 5/26 |
| 2020/0107663 A1* | 4/2020 | Eivaz | ..................... | A47G 29/20 |

FOREIGN PATENT DOCUMENTS

WO 2017/156586 A1 9/2017

OTHER PUBLICATIONS

Edelstein, Stephen, "Udelv Autonomous Delivery Vehicle Begins Testing in California," The Drive, Published Jan. 31, 2018 (3 pages). http://www.thedrive.com/tech/18113/udelv-autonomous-delivery-vehicle-begins-testing-in-california.
Ford Media Center, "Let's Give Them Something to Taco 'Bout: Enabling Self-driving Food Delivery with Postmates," Published Jun. 11, 2018 (2 pages). https://medium.com/self-driven/lets-give-them-something-to-taco-bout-enabling-self-driving-food-delivery-with-postmates-6d1358bdbf87.

* cited by examiner

*Primary Examiner* — Anshul Sood
(74) *Attorney, Agent, or Firm* — Brandon Hicks; Eversheds Sutherland (US) LLP

(57) ABSTRACT

A locker configured to store a package is disclosed. The locker includes a storage compartment, a door to the storage compartment, and a securing component attached to the storage compartment. The securing component actuates between a secured position and an unsecured position.

14 Claims, 13 Drawing Sheets

DELIVERY LOCKER AND ASSEMBLIES

FIELD OF THE DISCLOSURE

The disclosure generally relates to a locker, and more particularly relates to a locker configured to secure various sized packages.

BACKGROUND

Delivery companies have long struggled with the problem of safely and securely delivering packages to their customers. Generally, the process entails placing a package within a delivery truck and employing a courier to transport the package to a particular location. The transportation of the package can sometimes result in an unsuccessful delivery because of the package being unsecured within the courier's vehicle. For example, a courier might deliver a pizza. The pizza may be strapped behind a seat belt or loosely set upon a vehicle seat. As a result, the pizza may be damaged due to vehicle turbulence because the pizza was improperly secured.

Additionally, delivery companies have started to incorporate autonomous delivery vehicles into their fleets. Thus, there exists a need to securely deliver packages where a human may not be present during the transportation of the package.

Some or all of the above needs and/or problems may be addressed by certain embodiments disclosed herein.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
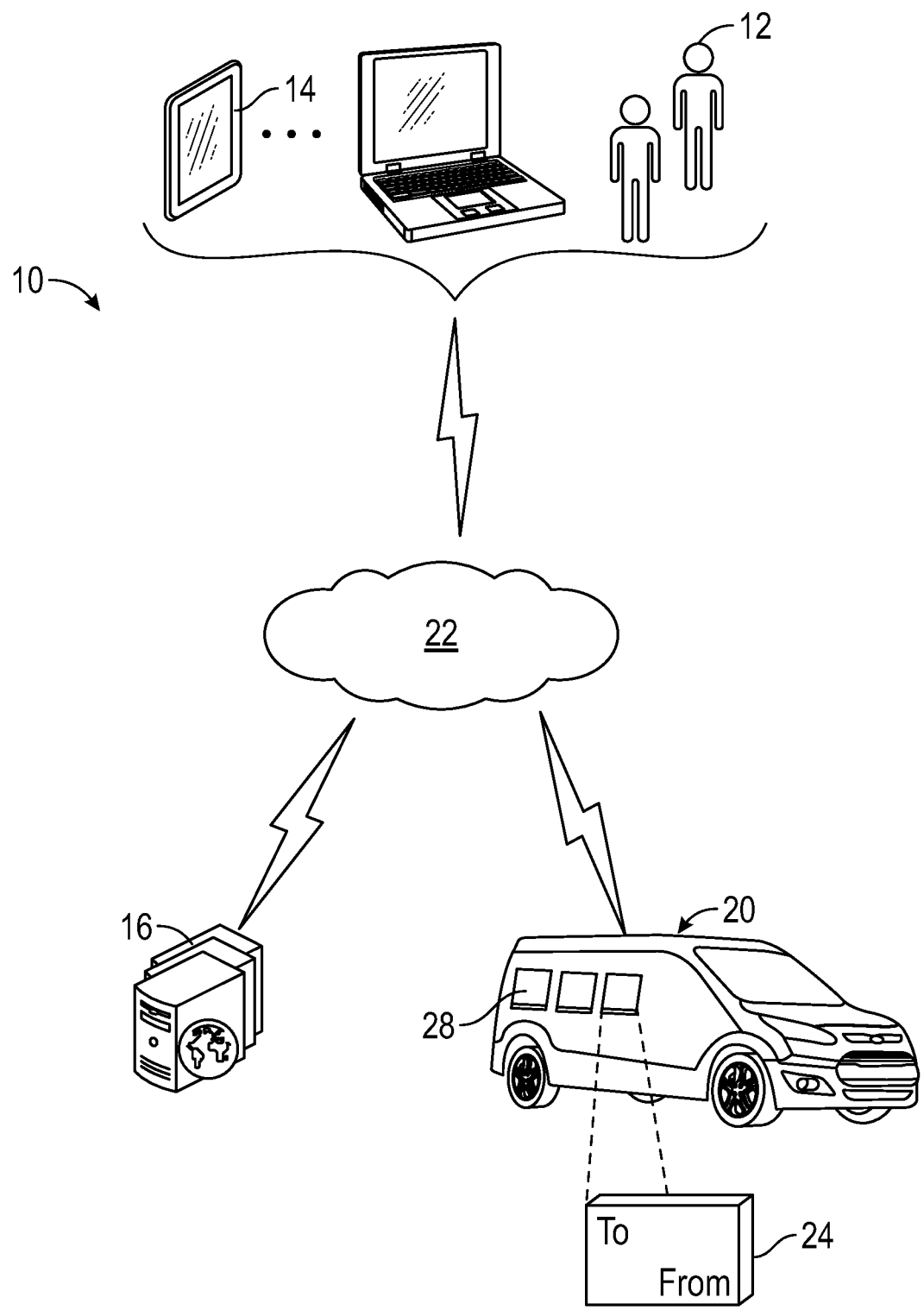
FIG. 1 depicts an illustrative architecture in accordance with one or more embodiments of the disclosure.

The disclosure is related to one or more lockers configured to store a package that is delivered by a vehicle. For example, the locker may be disposed within the side of the vehicle, and the door may be exposed to an area outside of the vehicle. The locker may be disposed at any location on the vehicle. That is, the locker may be accessible from the outside or within the vehicle. In this manner, a user may insert a package into the locker to be secured for delivery. The package may be secured into place by a securing component within the locker. For example, the securing component may be configured to fasten the package into place by closing with the door to the storage compartment. That is, as the door actuates to a closed position, the securing component may prevent the package from moving around the compartment. The vehicle may then transport the product to the specified destination, and the user may access the secured package stored within the locker. For example, the securing component may release the package from a secured position as the door is actuated to an open position.

In some instances, the vehicle may include a driver. In certain embodiments, the vehicle may be an autonomous vehicle. In some instances, the vehicle may be fully autonomous. In other instances, the vehicle may be remotely controlled, partially autonomous, or manually driven. The vehicle may be a car, truck, or any other transportation vehicle. In some instances, the autonomous vehicle may be capable of navigating to a particular user to deliver a secured package. For example, the autonomous vehicle may be equipped with a locker configured to securely store a package that is accessible to a user upon arrival. In some instances, the vehicle may navigate to a residence, the user may approach the vehicle, and the user may open the locker to retrieve the secured package. In other instances, the vehicle may arrive at a commercial property. The vehicle may navigate to any commercial or residential location that a vehicle may deliver a package.

In certain embodiments, the locker may include a securing component configured to actuate between a secured position for securing the package and an unsecured position for facilitating removal of the package from the locker. In some instances, the securing component may include at least one collapsible panel. For example, the securing component may include two collapsible panels configured to collapse as the locker is actuated to a closed position. That is, the collapsible panels may be configured to collapse on a package within the locker to secure the package placed within the locker. In other instances, the securing component may include a flexible material. For example, the flexible material may include a static end and a dynamic end coupled to a door. In this manner, as the door actuates to a closed position, the flexible material collapses to a secured position. In yet another embodiment, the securing component may include a suspended panel. For example, the suspended panel may include a plurality of frictional surfaces configured to actuate about a hinge within the locker. In this manner, the suspended panel may rest against a package inserted into the locker to secure the package within the locker. The package described herein may be of various sizes and shapes. For example, the package may be a box, bottle, or some other container. In other instances, the package may be an oblong shape. Any suitable package may be stored, secured, and/or transported within the locker.

In certain embodiments, the securing component may include one or more panels coupled to a biasing member. For example, one or more panels may include a first end and a second end. The first end may be coupled to the series of panels and configured to actuate about a pivot point (e.g., a hinge or flexible joint). The second end of the one or more panels may be coupled to a biasing member, where the biasing member is also attached to at least one other panel in the series of panels. In this manner, the second end of the panel actuates via the biasing member against the package. In some instances, the biasing member may be a spring. In other instances, the biasing member may be another compressible mechanism such as a flexible Belleville washer or foam. In some instances, the securing components may include two panels. The two panels may each be coupled to a biasing mechanism. In the secured position, each of the panels may bias against the package placed within the locker. In some instances, the panels may be lined with a frictional surface, such as a rubber, foam, or plastic. The panels coupled to the biasing mechanism may be a variety of different sizes or shapes. That is, the panels may be triangular, circular, square, or some other shape.

In certain embodiments, the securing component may be configured to actuate between a secured position for securing the package and an unsecured position. For example, the secured position may secure the package into place within the storage compartment. In some instances, the securing component may anchor, fasten, secure, or otherwise hold the package into place by various means in the secured position. The securing component may actuate to an unsecured position for the package to be removable. For example, the unsecured position may release the package from a secured position within the storage component. In some instances, the unsecured position may remove the securing component from contacting the package within the storage compartment.

In certain embodiments, the locker may be a storage compartment. In some instances, the storage compartment may be a series of panels surrounding the package. For example, the series of panels may include a top panel, a bottom panel, and a plurality of side panels. In other instances, the storage compartment may include one continuous panel. In yet other instances, the storage compartment may not include any panels. For example, the storage compartment may be another encompassing fixture such as a net. The panels may be any suitable size, shape, or configuration. In some instances, the panels may form a rectangular storage compartment. In other instances, the panels may form a cube, a pyramidal, or spherical storage compartment. The series of panels may be solid panels configured to secure the package within the locker. In other instances, the series of panels may be flexible or form fitting to the package within the locker. In another embodiment, the storage compartment includes a frame surrounding the package. That is, the frame may be attached to the securing component discussed herein and a door, both of which may be configured to secure the package within the storage compartment.

In certain embodiments, the securing component within the storage compartment may be at least one collapsible panel. For example, at least one collapsible panel may be disposed within the series of panels. In some instances, the securing component may be two collapsible panels disposed on opposite sides within the storage compartment. The collapsible panels may be configured to collapse as the door moves to a closed position. As discussed herein, the collapsible panels and the door may engage one another to move between a secured position and an unsecured position for the package. For example, as the door moves to a closed position, the collapsible panels may collapse toward the interior of the storage compartment, thereby collapsing onto the package within the storage compartment.

In some instances, the collapsible panel may include a first portion and a second portion. Between the first portion and the second portion of the collapsible panel may be a hinge. For example, the collapsible panel's first portion and second portion may include a top surface and a bottom surface. The hinge may be coupled to the bottom surface of the first portion and the top surface of the second portion. In this manner, the collapsible panel may bend about the hinge. In some instances, the hinge may split the collapsible panel along a perpendicular plane as the storage compartment door. In other instances, the hinge may split the collapsible panel along a parallel plane as the storage compartment door. The hinge may split the collapsible panel along any angle relative to the storage compartment door. In other embodiments, the collapsible panel may have multiple hinges. In some instances, the hinge may be rubber. In other instances, the hinge may be metal, plastic, or some other material and/or mechanism allowing rotational movement of the collapsible panel (e.g. a door hinge).

In certain embodiments, the securing component may be a suspended panel within the storage compartment. For example, the suspended panel may be coupled to a hinge within the storage compartment. That is, the suspended panel may rotate between a secured position and an unsecured position when a package is placed within the storage compartment. In this manner, as a package is placed within the storage compartment, the suspended panel may rest against the package thereby applying a securing force to the package. Conversely, the suspended panel may rotate to an unsecured position so that the package may be removed from within the storage compartment. In some instances, the suspended panel may be a plurality of frictional surfaces. That is, a series of elongated panels may be coupled to form the suspended panel. In other instances, the suspended panel may be a single, continuous panel.

In certain embodiments, the locker may include a frame. In some instances, the frame may include a plurality of slots. The plurality of slots may receive a series of pins configured to anchor and guide movement of the series of panels. The frame may be L-shaped, rectangular cross-sectional beams. In other instances, the frame may form a square, rectangle, circle, or another geometric shape. The frame may have a triangular, square, circular, or some other shaped cross-section. The frame may be any suitable size, shape, or configuration. In certain embodiments, the storage compartment may include two opposed sides to the frame. The two opposed sides of the frame may guide the door via the plurality of slots. In some instances, the two opposed sides of the frame may guide the securing component.

In certain embodiments, a plurality of slots is disposed on the frame. In some instances, one or more of the plurality of slots may comprise an elongated channel disposed along the frame. In other instances, one or more of the plurality of slots may be a circular aperture. As discussed herein, the plurality of slots may be configured to guide the series of pins disposed on the door and/or the securing component (e.g., the collapsible panel, the flexible material, the suspended panel). The plurality of slots may be configured to only allow rotational movement of a pin in the series of pins. In some instances, the plurality of slots may intersect. For example, a slot may be disposed on a first side of the frame and a second slot may be disposed on a second side of the frame. The slots may intersect perpendicularly within the frame. In other embodiments, the slots may intersect by another angle within the frame. In this manner, the intersection of slots may be configured to provide a path to allow a pin on the door within a door slot to guide a pin on the collapsible panel between the secured position and unsecured position. The slots may include a flexible material slot, a handle slot, an anchor slot, or some other slot therein. In some instances, the slots may be of a square cross-sectional area. In other instances, the slots may be of rectangular, triangular, circular, or some other cross-sectional area.

In certain embodiments, the locker and other components therein include a series of pins disposed thereupon. For example, the series of pins may be disposed on the door and the series of panels. In this manner, the series of pins may be configured to interact within at least one slot of the plurality of slots. That is, the series of pins may be set within the slots to guide along the frame of the locker. In some instances, the series of pins may be a cylindrical post mounted onto a locker component. In other instances, the series of pins may be a rectangular, triangular, or circular post. In yet other instances, the series of pins may instead be balls, rollers, or some other component configured to move the locker components along the frame.

In certain embodiments, the locker includes a door configured to actuate between an open position and a closed position. In some instances, the open position of the door corresponds to the unsecured position, and the closed position corresponds to the secured position. For example, the door may slide within the frame via the plurality of slots between the open position and the closed position. As previously discussed, the door may be coupled to a series of pins configured to interact with a pin disposed on the collapsible panel. In this manner, as the door slides to a closed position, the collapsible panel may collapse, thereby putting the storage compartment in the secured position. Accordingly, as the door slides to an open position within the frame, the series of pins may engage the pin on the collapsible panel to elongate the collapsible panel into an unsecured position. In other embodiments, the open position of the door may correspond to a secured position and the closed position of the door may correspond to a secured position.

In certain embodiments, the door may be coupled to flexible material with a proximate end and a distal end. That is, the door may be coupled to flexible material's proximate end. Whereas, the distal end of the flexible material may be coupled to a static point within the storage compartment. In this manner, as the door slides to an open position, the flexible material may elongate within the storage compartment. That is, the flexible material may be in the unsecured position for the package within the storage compartment. Conversely, as the door slides to a closed position, the flexible material may enclose the package into a secured position. In some instances, the flexible material may be thermoplastic polyurethane. In other instances, the flexible material may be cotton, polyester, wool, plastic, metal, or some other flexible material.

In certain embodiments, the door may be a tambour door. That is, a door with flexible panels. In other instances, the door may be a single solid panel. In some instances, the door may be coupled to a handle. In this manner, the handle may be configured to allow a user to actuate the door between the open position and the closed position. In other instances, the door may be coupled to a weighted bar. That is, the weighted bar may be an elongated weight disposed on one end of the door configured to help slide the door to the closed position.

ILLUSTRATIVE EMBODIMENTS

Turning now to the drawings, FIG. 1 depicts an illustrative architecture 10 in which techniques for providing the systems and methods disclosed herein may be implemented. The illustrative architecture 10 may include a number of users 12 (utilizing one or more computing devices 14), one or more package delivery system computers 16, and a delivery vehicle 20. All of the various components may interact with one another directly and/or over one or more networks 22. For example, in some instances, all of the various components may access, receive from, transmit to, or otherwise interact with one another directly and/or over the networks 22 to facilitate the delivery of a package 24 from the delivery vehicle 20 to the user 12.

In certain embodiments, a package 24 may be placed inside the delivery vehicle 20 via the locker 28. The locker 28 may be configured to be securely deliver the package 24 to the user 12. In this manner, the delivery vehicle 20 may travel between a first location (e.g., a distributor warehouse or restaurant) and a second location (e.g., a user's residence). In some instances, the vehicle may be autonomous and/or include a driver. In some instances, the locker 28 of the delivery vehicle 20 may be accessed by the user 12 upon the delivery vehicle's arrival to the second location.

The package delivery system computers 16 may be any type of computing devices such as, but not limited to, mobile, desktop, and/or cloud computing devices, such as servers. The package delivery system computers 16 may include one or more servers, perhaps arranged in a cluster, as a server farm, or as individual servers not associated with one another. Other server architectures may also be used to host the package delivery system computers 16. The package delivery system computers 16 may be equipped with one or more processors and a memory, which may include an operating system and one or more application programs or services for implementing the features disclosed herein.

In certain embodiments, the users 12 may utilize the computing devices 14 to access a user application interface (e.g., an app or website) that may be provided by, created by, or otherwise associated with a package delivery system via the networks 22. In some instances, the computing devices 14 may be configured to present or otherwise display the user application interface to the users 12. In some aspects, the user application interface may allow the users 12 to access, receive from, transmit to, or otherwise interact with the package delivery system via the package delivery system computers 16. In addition, the user application interface may allow the users 12 to access, receive from, transmit to, or otherwise interact with, the delivery vehicle 20.

The user devices 104 may be any type of computing devices including, but not limited to, desktop personal computers (PCs), laptop PCs, mobile phones, smart phones, personal digital assistants (PDAs), tablet PCs, game consoles, set-top boxes, wearable computers, e-readers, web-enabled TVs, cloud-enabled devices and work stations, and the like. In some instances, each user device 14 may be equipped with one or more processors 15 and a memory 17 to store applications and data, such as a user application 19 that may display the user application interface 26.

Figure 2:
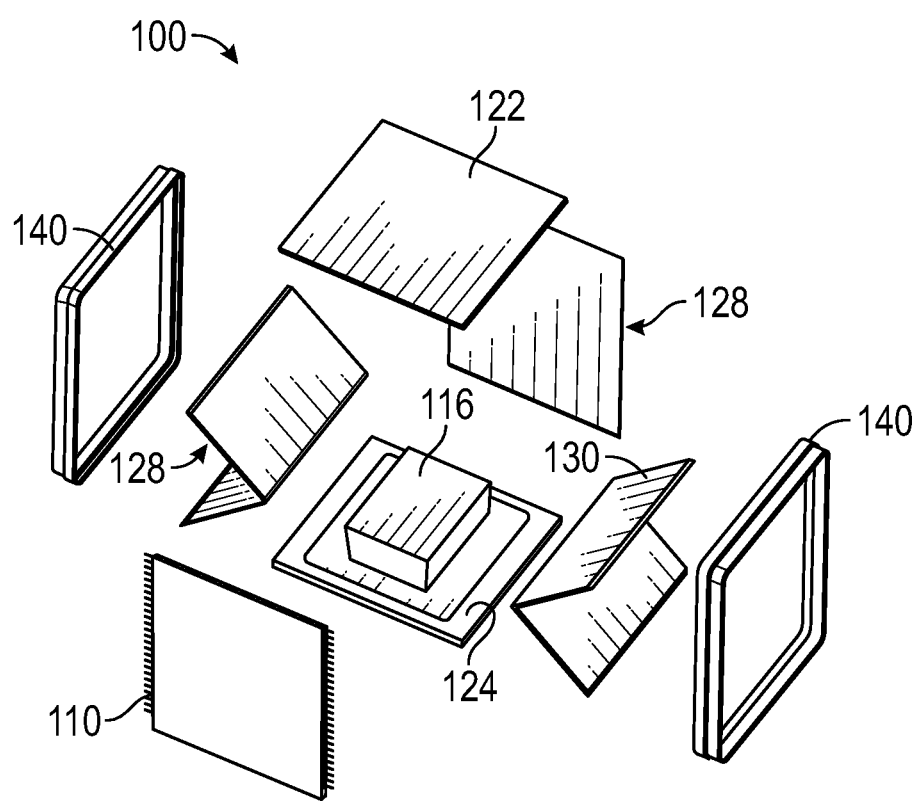
FIG. 2 depicts an exploded view of a locker in accordance with one or more embodiments of the disclosure.

FIG. 2 is illustrative of an exploded view of the locker 100 configured to secure a package 116. The locker 100 may include a door 110, a series of panels 120 and a frame 140. The locker 100 may include a storage compartment 102 therein. The door 110 and the series of panels 120 may set within the frame 140 via the series of pins 154 discussed herein. In other instances, the series of panels 120 may be attached to the frame 140 by fasteners, adhesives, or other means. As depicted in FIG. 2, the frame 140 may include sides opposite of one another. Each of the series of panels 120 and the door 110 may come together to form a cube. In other instances, the series of panels 120 and the door 110 may form some other shapes. The door 110, the series of panels 120, and the frame 140 may form an internal volume for the package 116 secured therein. The series of panels 120 may include a top panel 122, a bottom panel 124, and a plurality of side panels 128.

Figure 3A:
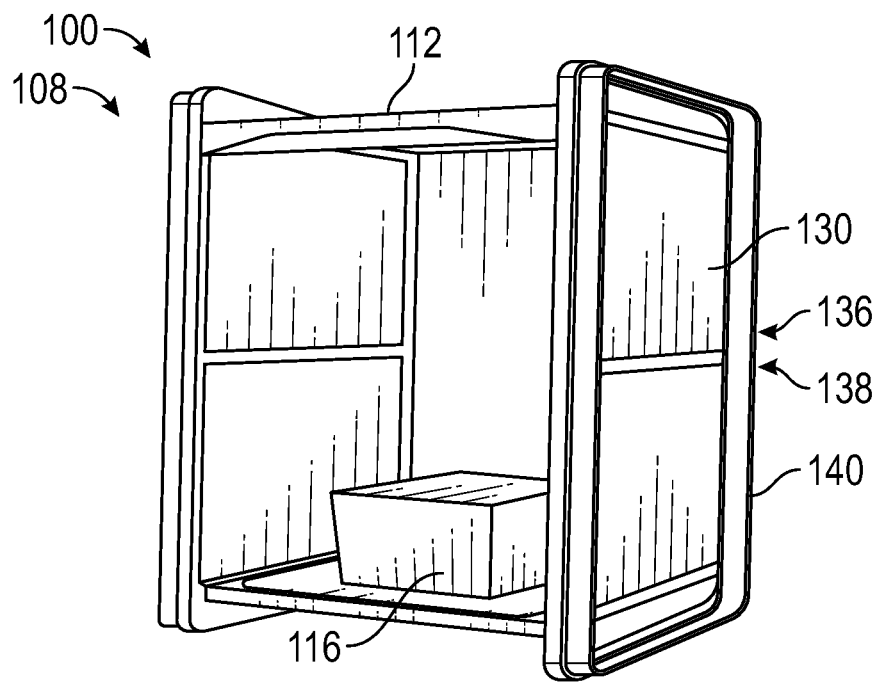
FIG. 3A depicts the locker in an unsecured position in accordance with one or more embodiments of the disclosure.
Figure 3B:
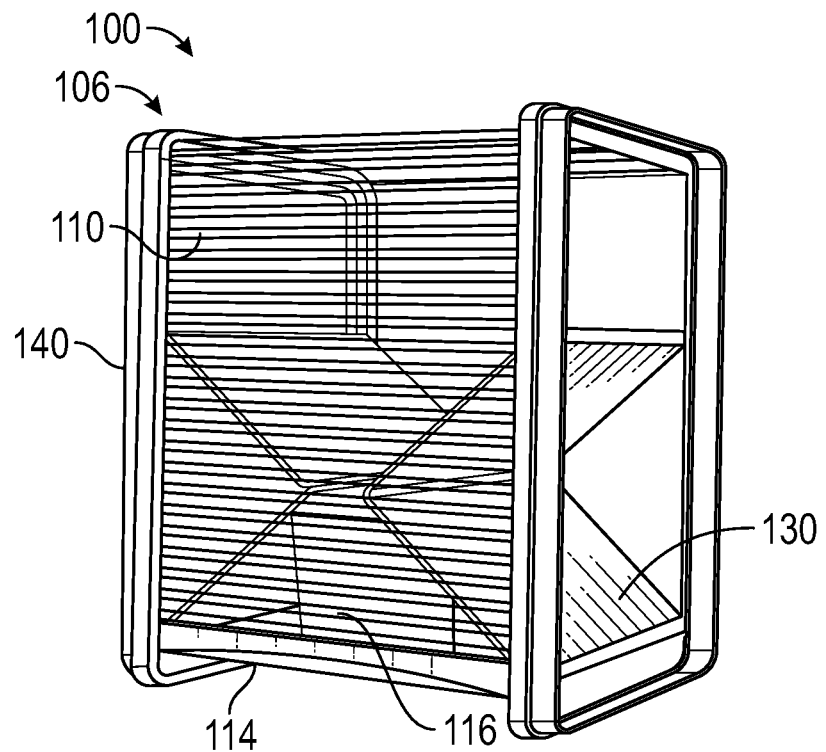
FIG. 3B depicts the locker in a secured position in accordance with one or more embodiments of the disclosure.
Figure 3C:
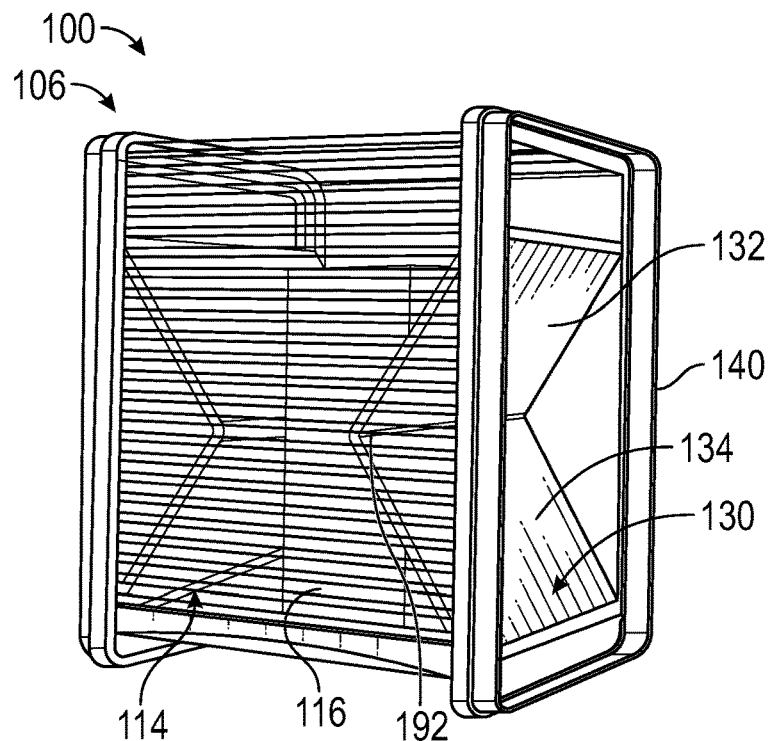
FIG. 3C depicts the locker in the secured position in accordance with one or more embodiments of the disclosure.
Figure 3D:
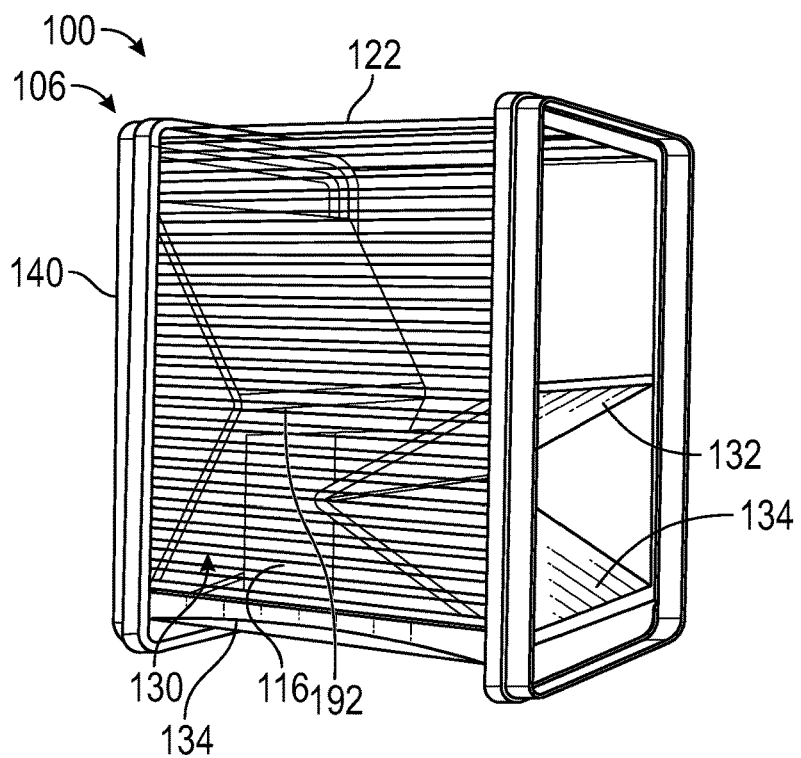
FIG. 3D depicts the locker in the secured position in accordance with one or more embodiments of the disclosure.

In some embodiments, as shown in FIGS. 3A-3D, the locker 100 is configured to actuate between a secured position 106 and an unsecured position 108. That is, in the secured position 106, the package 116 is secured within the locker 100. In the unsecured position 108, the package is unsecured within the locker 100. In this manner, the secured position 106 may correspond to the door 110 being in a closed position 114 and the unsecured position 108 corresponds to the door 110 being in an open position 112. For example, the door 110 may be in the open position 112, and the user may place a package 116 within the locker 100. As previously mentioned, the package may be of various sizes and shapes. As the door 110 moves to a closed position 114, a pair of collapsible panels 130 may collapse at least partially onto the package 116 to secure the package 116 within the storage compartment 102. Conversely, as the door 110 moves to an open position 112, the collapsible panels 130 may extend upward off of the package 116 to move the locker 100 to an unsecured position 108. In some instances, the locker 100 may include at least one collapsible panel 130. In other instances, the locker 100 may include more than one collapsible panel 130. As shown in FIGS. 3A-3D, the door 110 and the collapsible panels 130 are guided along the frame 140 of the locker 100. The collapsible panels 130 may collapse at different angles within the locker 100 depending on the size, shape, and location of the package 116 placed therein. As shown in FIG. 3C, the collapsible panels 130 may each collapse 90 degrees, whereas in FIG. 3D, one collapsible panel 130 may collapse 90 degrees and the other collapsible panel 130 may collapse 60 degrees.

In some embodiments, as shown in FIGS. 3A-3D, the collapsible panels 116 include a first portion 132, a second portion 134, and a hinge 192. The first portion 132 and the second portion 134 may be configured to rotate about the hinge 192. As discussed herein, the first portion 132 and the second portion 134 may include a series of pins 154 disposed thereupon to guide the panels within the frame 140. In some instances, the first portion 132 may include a bottom surface 136 and the second portion 134 may include a top surface 138. The bottom surface 136 of the first portion 132 may be attached to the hinge 192. In addition, the top surface 138 of the second portion 134. In this manner, as the first portion 132 slides down the frame 140 the bottom surface 136 may rotate clockwise. In other instances, as the first portion 132 slides down the frame 140 the bottom surface 136 may rotate counter-clockwise. The rotation of the first portion 132 may force the second portion 134 to rotate in the opposite direction. That is, as the first portion 132 rotates clockwise, the second portion 134 may rotate counter-clockwise. In other embodiments, the collapsible panels 130 may rotate in the same direction to secure or unsecure the package.

Figure 4:
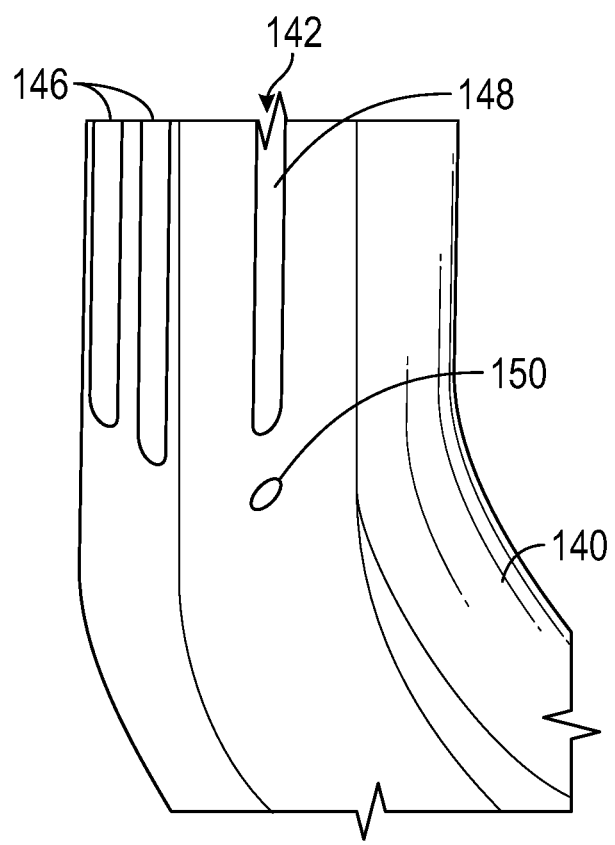
FIG. 4 depicts a magnified view of a plurality of slots of the locker in accordance with one or more embodiments of the disclosure.
Figure 5:
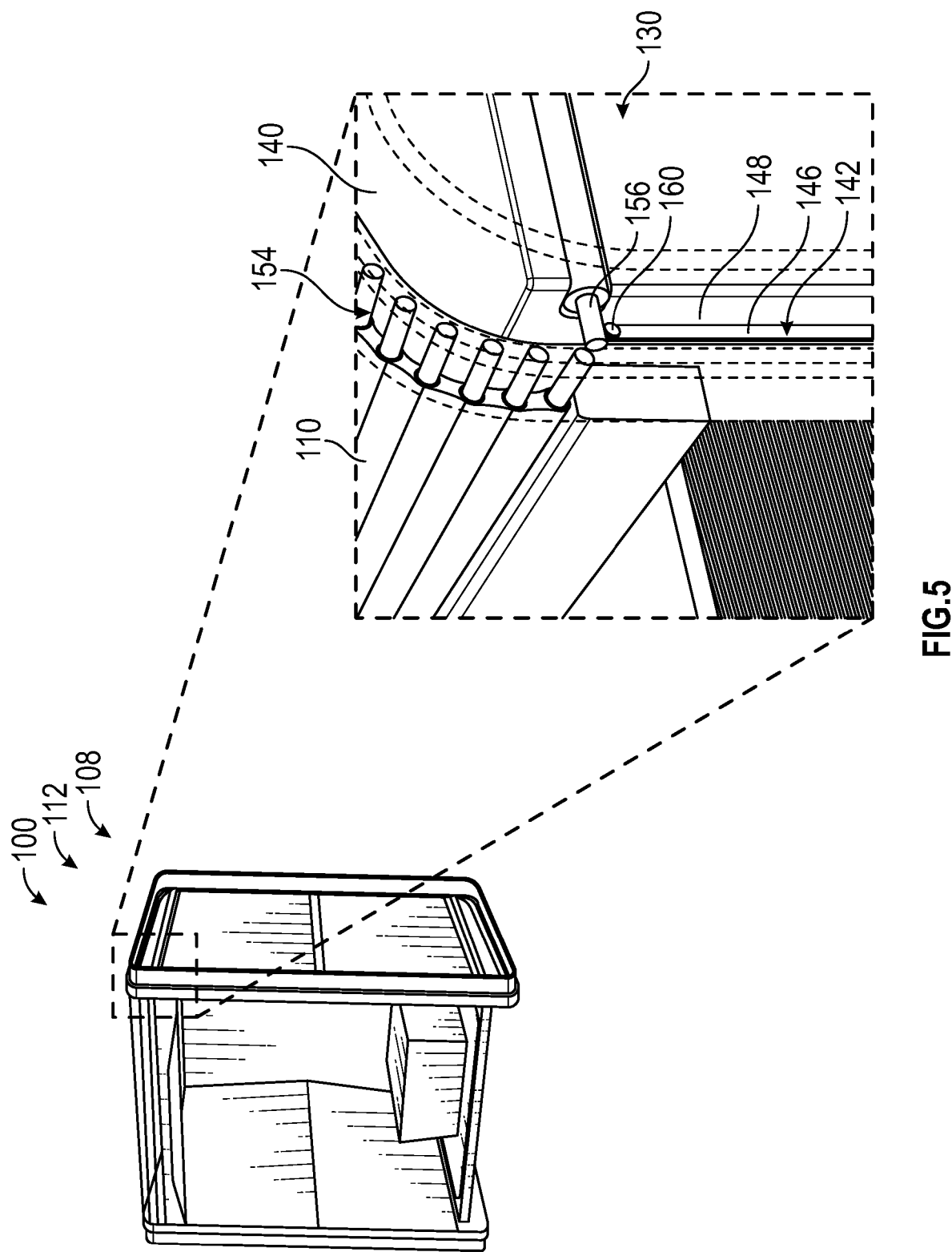
FIG. 5 depicts a magnified view of a securing component of the locker in the unsecured position in accordance with one or more embodiments of the disclosure.

In some embodiments, as shown in FIG. 4, the frame 140 of the locker 100 includes a plurality of slots 142. The plurality of slots 142 may be configured to guide the door 110 and the series of panels 120. Further, as discussed herein, the plurality of slots 142 may intersect within the frame 140. In some instances, the frame 140 may be elongated door slots 146 by which the door 110 (e.g., as shown in FIGS. 3A-3D) is guided along via a series of pins 154 (e.g., as shown in FIG. 5). The frame 140 may include a set of elongated panel slots 148 and an anchor slot 150. In this manner, one pin of the series of pins 154 is disposed on the collapsible panel 130 (e.g., as shown in FIGS. 3A-3D) first portion 132 and second portion 134. In some instances, one of the set of elongated door slots 146 may intersect with one of the set of elongated panel slots 148.

In some instances, the plurality of elongated slots 142 may extend along the frame 140. The elongated slots 142 may be rounded on either end and form a straight channel open to the surface of the frame. In other instances, the elongated slots 142 may wind around the frame 140, or form another path along the frame 140. The elongated slots 142 may include squared edges on either end of the slot, or may include some other shaped edge along either end of the slot.

FIG. 5 illustrates the locker 100 in an unsecured position 108. In this manner, the door 110 includes at least one pin of the series of pins 154 configured to engage at least one pin of the series of pins 154 of the collapsible panel 130. For example, as the door 110 may include a door pin 160 disposed within one of the elongated door slots 146 and the collapsible panel 130 may include a first set of pins 156 disposed within one of the elongated panel slots 148. As previously mentioned, one of the elongated door slots 146 and one of the elongated panel slots 148 may intersect within the frame 140. In this manner, as the door pin 160 moves along the elongated door slot 146, the door pin 160 may engage with one pin of the first set of pins 156 of the collapsible panel 130. That is, as the door 110 moves to the open position 112, the door pin 160 moves one pin of the first set of pins 156 and the collapsible panel 130 extends upward. In other embodiments, the engagement between the door pin 160 and the collapsible panel pin may be by another mechanism, such as hooks, magnetism, fasteners, or some other mechanism.

As shown in FIG. 5, the door 110 includes a series of pins 154 disposed on one side of the door 110. The series of pins 154 may guide the door along the elongated door slot 146. In some instances, the series of pins 154 disposed along the door may be static and evenly spaced along the door 110. In other instances, the series of pins 154 may be dynamic and roll as the door is guided up the elongated door slot 146.

Figure 6:
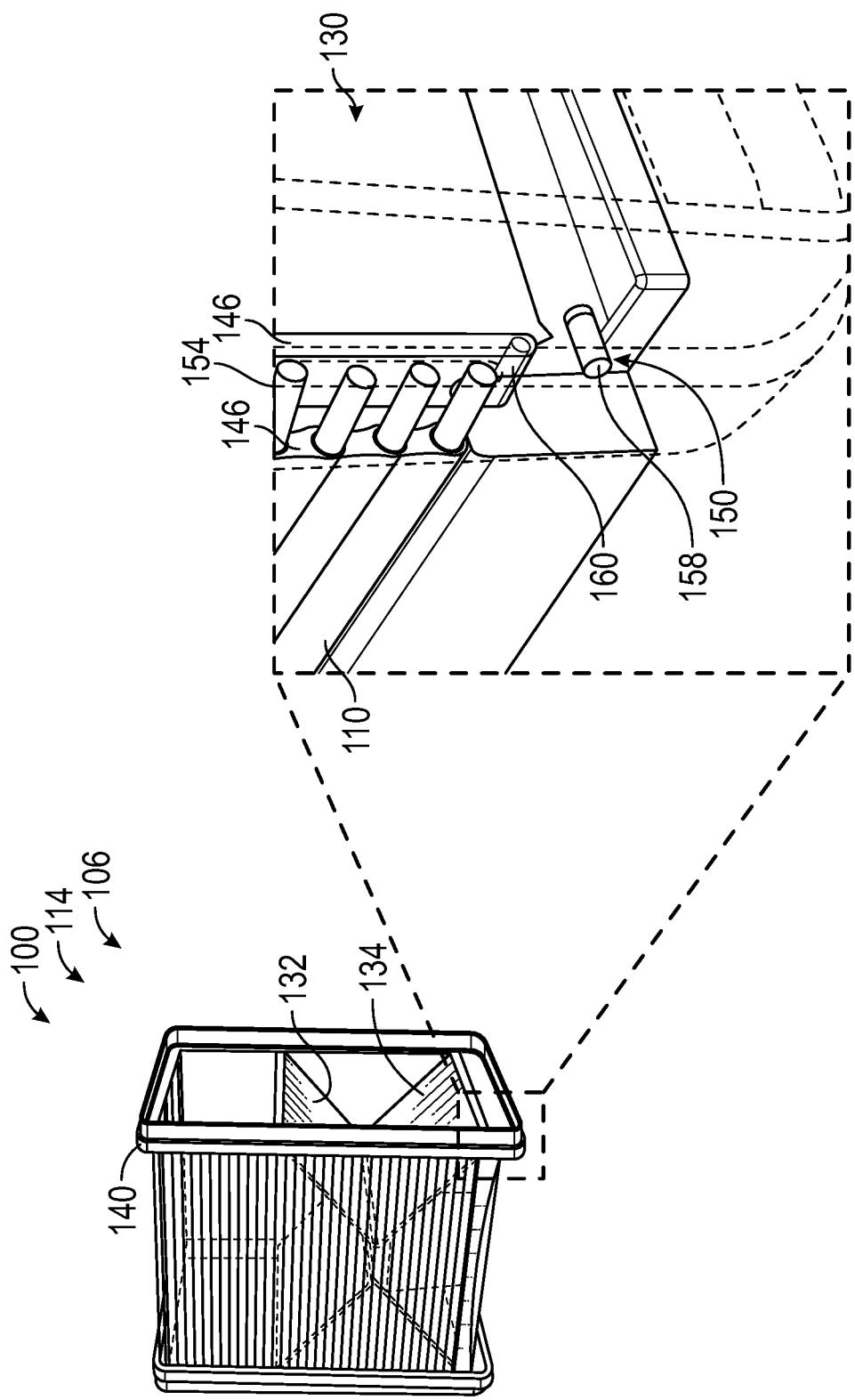
FIG. 6 depicts a magnified view of the securing component of the locker in the secured position in accordance with one or more embodiments of the disclosure.

FIG. 6 illustrates the locker 100 in a secured position 106. That is, the collapsible panels 130 may be rotated inward about the hinge as the door 110 is moved to the closed position 114. In some instances, as the door 110 slides to a closed position 114, the first set of pins 156 are suspended within the set of elongated panel slots 148 above the door pin 160. That is, the collapsible panel 130 may be rotated inwards to rest against the package 116 and the collapsible panel 130 may no longer rotate. In other instances, the collapsible panel 130 may rotate until the first portion 132 and the second portion 134 rest against one another. As shown in FIG. 6, one of the second set of pins 158 is disposed within an anchor slot 150. The anchor slot 150 may allow rotational movement of the second set of pins 158 and anchor the second set of pins 158 to a particular spot along the frame 140. In this manner, the second portion 134 of the collapsible panel 130 may be able to rotate accordingly. The anchor slot 150 may be disposed anywhere along the frame 140.

Figure 7:
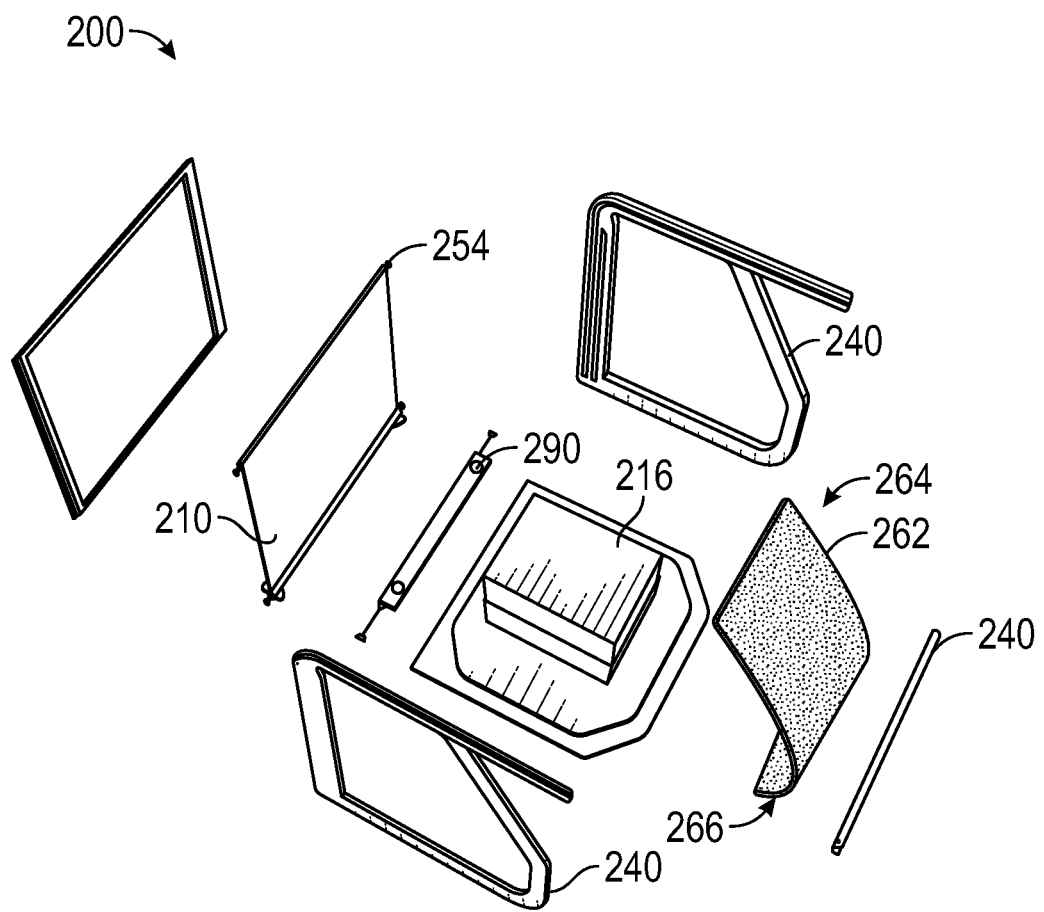
FIG. 7 depicts an exploded view of a locker in accordance with one or more embodiments of the disclosure.
Figure 8:
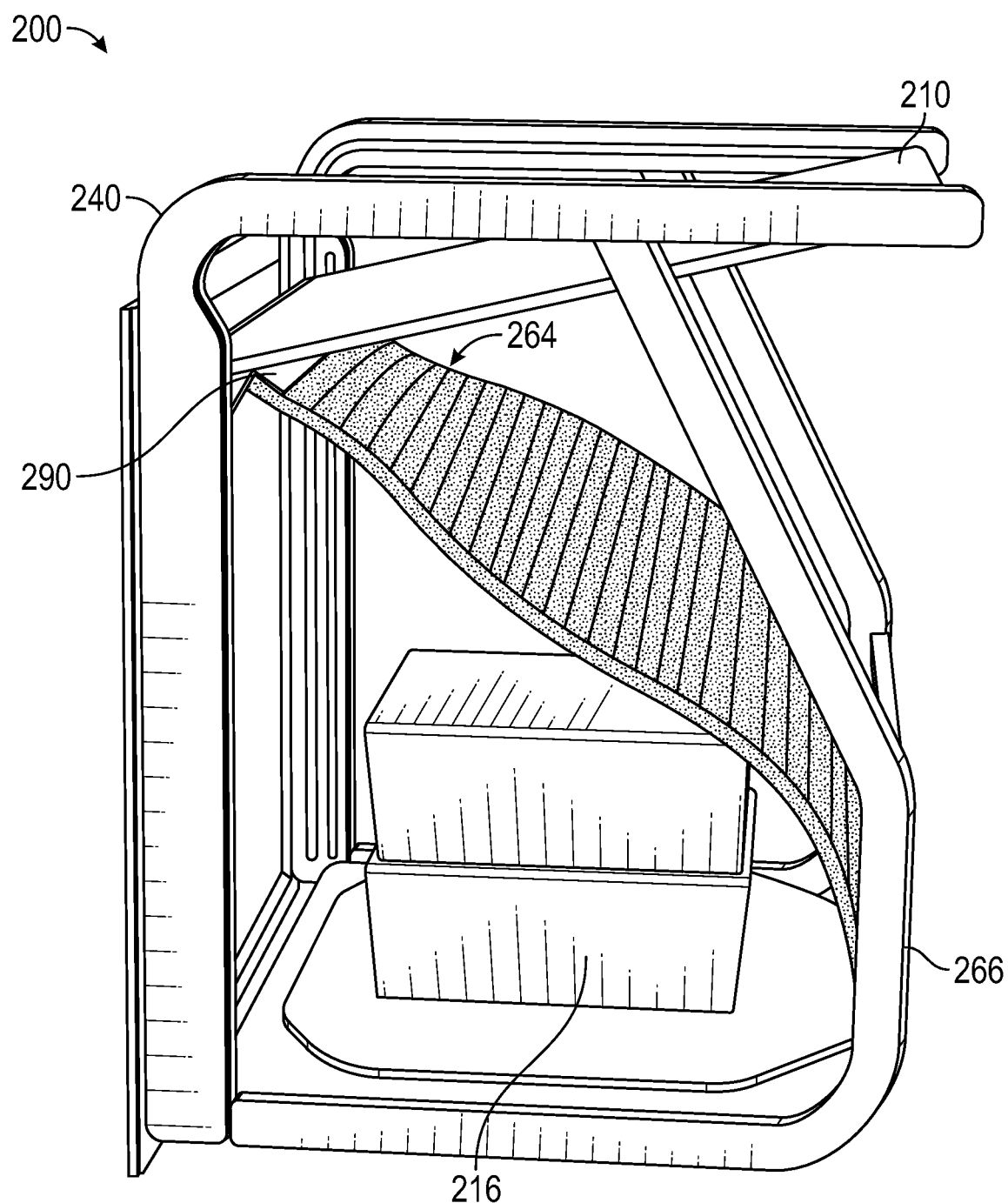
FIG. 8 depicts a side view of the locker in an unsecured position in accordance with one or more embodiments of the disclosure.
Figure 9:
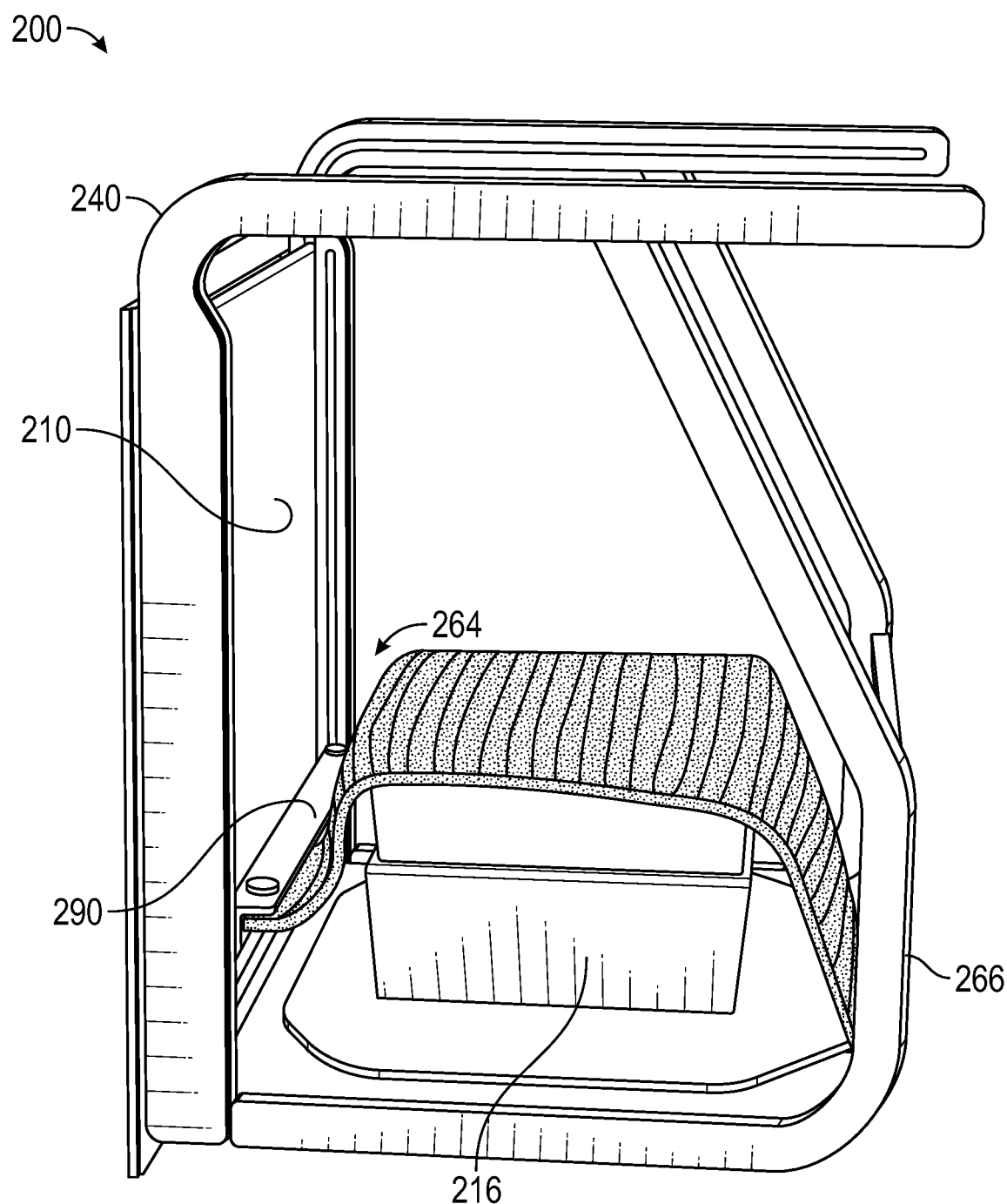
FIG. 9 depicts a side view of the locker in a secured position in accordance with one or more embodiments of the disclosure.

In some embodiments, as shown in FIG. 7, the locker 200 may include a flexible material 262 (e.g., a fabric) configured to be the securing component of the locker 200. That is, the flexible material 262 may have a proximate end 264 and a distal end 266. The proximate end 264 may be coupled to the door 210. In some instances, the distal end 266 of the flexible material 262 may be anchored to the frame 240 in a static position. That is, the distal end 266 of the flexible material 262 may not move as the proximate end 264 moves with the door 210. The flexible material 262 may adjust between the secured position 206 and the unsecured position 208 as the door 210 moves between the closed position 214 and the open position 212, respectively (e.g., as shown in FIGS. 8-9). As shown in FIGS. 8-9, the flexible material 262 proximate end 264 is attached to a weighted bar 290 that is attached to the door 210. In this manner, when the door 210 is in the open position 212, the flexible material 262 may be lifted away from the package 216, thereby placing the locker 200 in an unsecured position 208 (e.g., as shown in FIG. 8). Conversely, as the door 210 slides along the frame 240 to a closed position 214, the flexible material 262 places the locker 200 in a secured position 206 (e.g., as shown in FIG. 9). In some instances, the flexible material 262 may be flexible to wrap around the packages. In other instances, the flexible material 262 may be rigid. The flexible material may at least partially drape over the package in the secured position. In some instances, the distal end of the flexible material may be attached to a wall within the storage compartment opposite the door. The door 210 and the flexible material 262 may set within the frame 240 via the series of pins 254.

Figure 10:
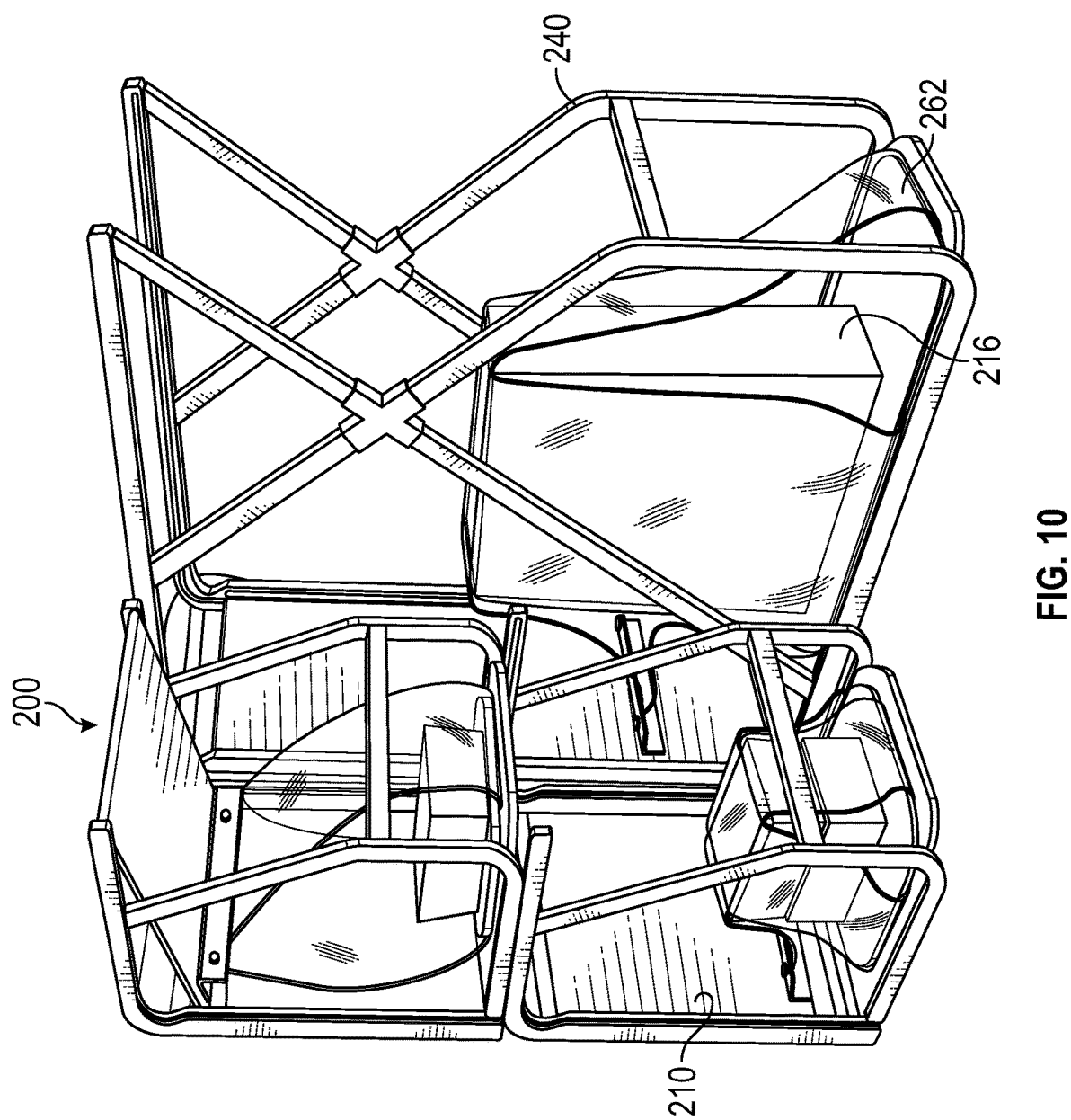
FIG. 10 depicts a rear perspective view of a set of lockers within a vehicle in accordance with one or more embodiments of the disclosure.

In some embodiments, as shown in FIG. 10, one or more lockers 200 are coupled to a vehicle. In this manner, the door 210 to the locker 200 may be disposed to the exterior of the vehicle and the package kept within the interior. A user may then access the door of the locker to retrieve the package secured within the locker. In some instances, the storage compartment may be a flexible material 262, such as a fabric bag. The door may move to an open position associated with the unsecured position. The door may move upward or downward relative to the vehicle to move to the open position. In other instances, the door may move side to side or some combination of upwards, downwards, and side to side.

Figure 11A:
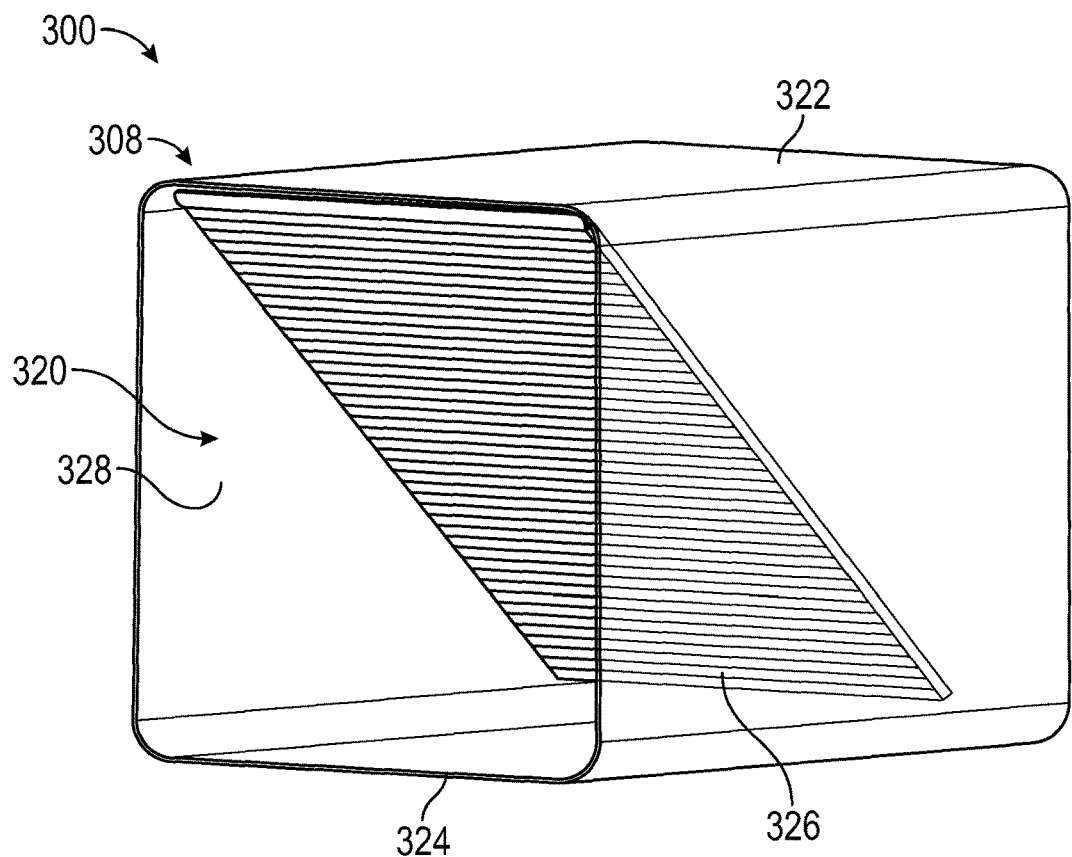
FIG. 11A depicts a locker in an unsecured position in accordance with one or more embodiments of the disclosure.
Figure 11B:
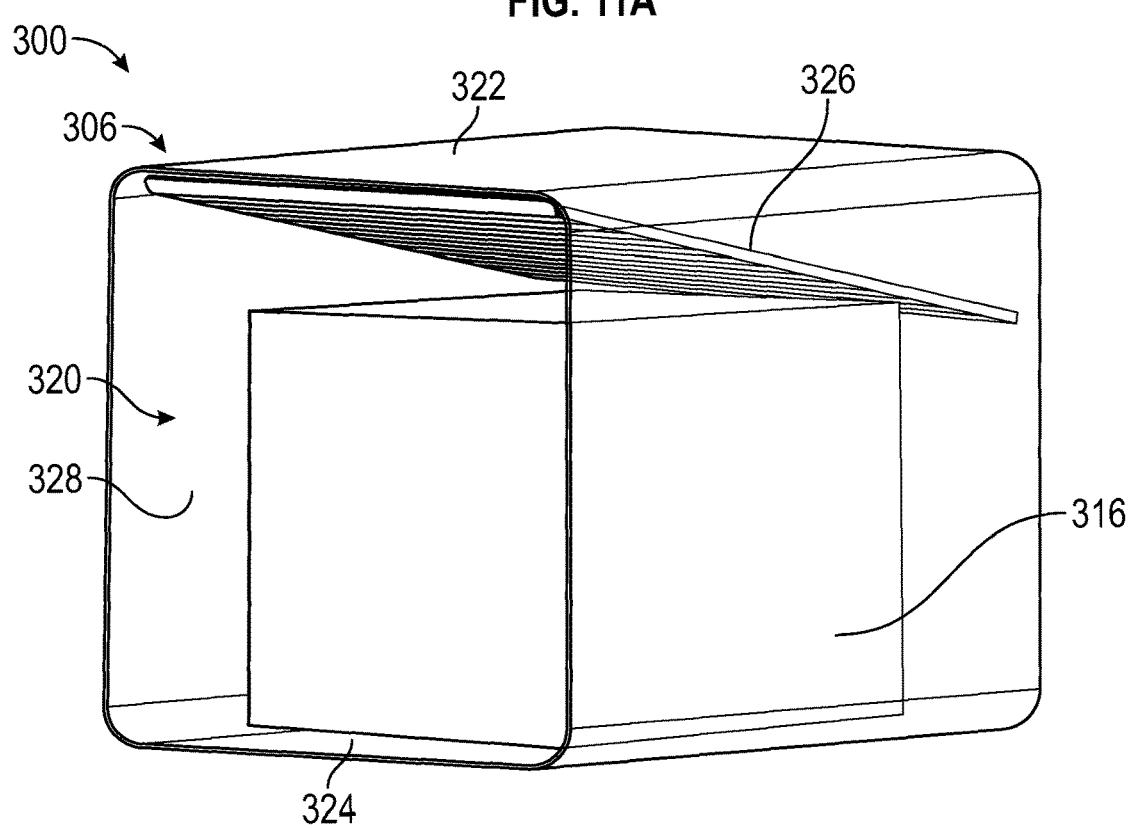
FIG. 11B depicts the locker in a secured position in accordance with one or more embodiments of the disclosure.

In some embodiments, as shown in FIGS. 11A and 11B, the locker 300 may include a series of panels 320. The series of panels 320 may include a top panel 322, a bottom panel 324, a plurality of side panels 328, and a suspended panel 326. The series of panels 320 may be configured to act as the securing component 304. For example, the suspended panel 326 may be coupled to the top panel 322 and configured to rotate about a hinge 394. In this manner, as a package 316 is inserted within the locker 300, the suspended panel 326 may rotate away from the door (not shown) as shown in FIG. 11B. The suspended panel 326 may rest against the package 316 in a securing position 306 and apply a downward force on the package 316. In other instances, the suspended panel 326 may not contact a package 316 in an unsecured position 308. In some instances, the suspended panel 326 may include a plurality of frictional surfaces 370. That is, the plurality of frictional surfaces 370 may be a series of elongated panels composed of rubber. As the package 316 is inserted into the locker 300 the rubber frictional surfaces 370 may grip the package 316. In some instances, the suspended panel 326 may be a solid, continuous surface. In other instances, the suspended panel 326 may be a flexible piece of cloth, rubber, metal, or some other material configured to secure the package 316 within the locker.

Figure 12A:
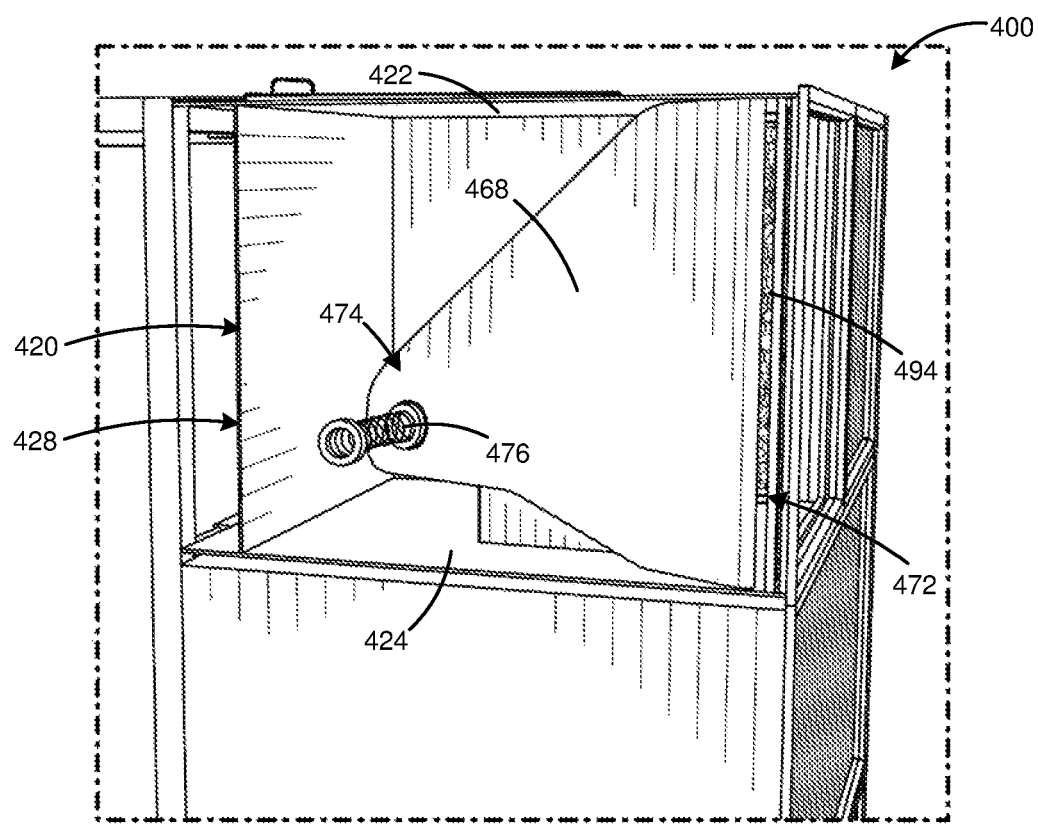
FIG. 12A depicts a side view of a locker in accordance with one or more embodiments of the disclosure.
Figure 12B:
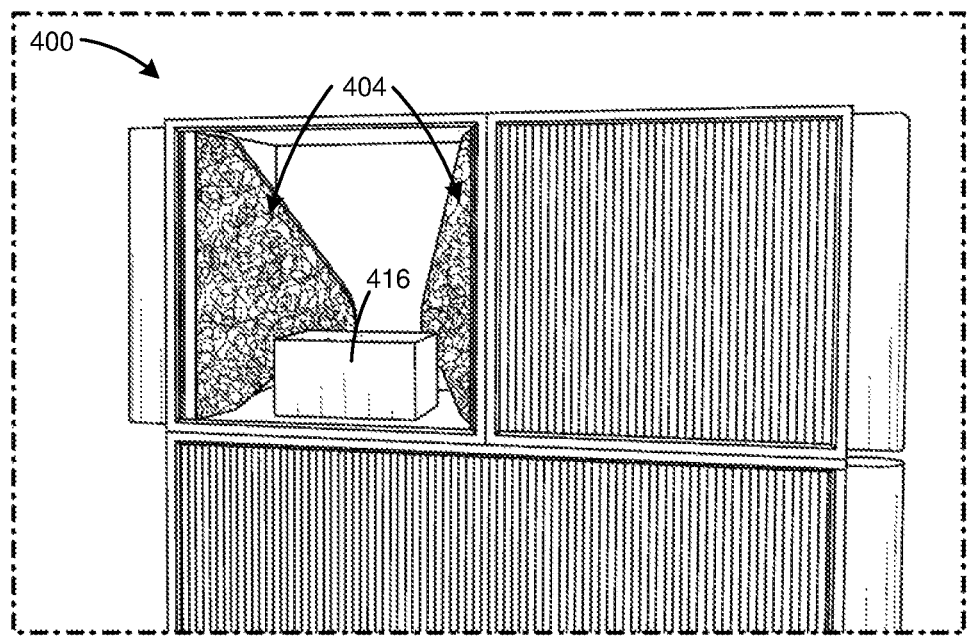
FIG. 12B depicts a front perspective view of the locker in accordance with one or more embodiments of the disclosure.

In some embodiments, as shown in FIGS. 12A and 12B, the locker 400 may include a series of panels 420. The series of panels 420 may include a top panel 422, a bottom panel 424, a plurality of side panels 428, and at least one biasing panel 468. The series of panels 420 may be configured to act as the securing component 404. For example, the biasing panel 468 may be coupled to one of the other panels at a first end 472 and configured to rotate about a hinge 494 or flexible joint. In some instances, the second end 474 of the biasing panel 468 may be coupled to a biasing member 476 (e.g., a spring, a Belleville washer, or a foam). That is, the biasing member 476 may be disposed between the biasing panel 468 and one of the other panels in the series of panels 420. In this manner, as a package 416 is inserted into the locker 400, the at least one biasing panel 468 may apply a force against the package 416 to secure the package within the locker 400. In some instances, the locker 400 may include two biasing panels 468 and each biasing panel 468 may apply force to the package 416 as the package is place inside the locker. The biasing panels may include a foam, rubber, or plastic surface configured to provide a frictional surface against the package.

EXAMPLE EMBODIMENTS

In some instances, the following examples may be implemented together or separately by the systems and methods described herein.

Example 1 may include a locker configured to store a package, the locker comprising: a storage compartment; a door to the storage compartment, wherein the door comprises an open position and a closed position; and a securing component coupled to the door, wherein the securing component comprises a secured position for securing the package within the storage compartment when the door is in the closed position and an unsecured position for removing the package from the storage component when the door is in the open position.

Example 2 may include the locker of example 1, further comprising: a frame, wherein the frame comprises a plurality of slots, wherein the door is coupled to the frame; a series of panels coupled to the frame, wherein the securing component comprises at least one collapsible panel of the series of panels; and a series of pins disposed on the door and the series of panels, wherein the series of pins are configured to interact within at least one slot of the plurality of slots.

Example 3 may include the locker of example 2 and/or some other example herein, wherein the frame comprises: a set of anchor panel slots; a set of elongated door slots; and a set of elongated panel slots, wherein at least one door slot and at least one panel slot perpendicularly intersect within the frame.

Example 4 may include the locker of example 3 and/or some other example herein, wherein at least one pin on the door guides the at least one pin on at least one panel within at least one slot as the door moves to an open position.

Example 5 may include the locker of example 3 and/or some other example herein, wherein the at least one collapsible panel is configured to collapse as the door moves to a closed position.

Example 6 may include the locker of example 2 and/or some other example herein, wherein the at least one collapsible panel comprises: a first portion; a second portion; and a flexible hinge coupled to a bottom surface of the first portion and a top surface of the second portion.

Example 7 may include the locker of example 6 and/or some other example herein, wherein a first set of pins of the series of pins are disposed on the first portion and a second set of pins are disposed on the second portion, wherein the first set of pins guide the first portion along the at least one slot and the second set of pins are each configured to rotate within an anchor slot.

Example 8 may include the locker of example 2 and/or some other example herein, wherein the door comprises a door handle coupled to at least one pin operably disposed within at least one slot.

Example 9 may include the locker of example 2 and/or some other example herein, comprising: a frame, wherein the door is anchored within the frame via a first set of pins; and a handle coupled to the door, wherein the securing component comprises a flexible material with a proximate end and a distal end, wherein the proximate end is coupled to the door.

Example 10 may include the locker of example 9 and/or some other example herein, wherein the frame comprises a door slot and a flexible material slot.

Example 11 may include the locker of example 10 and/or some other example herein, further comprising a weighted bar coupled to the door, wherein the proximate end of the flexible material is coupled to the weighted bar.

Example 12 may include the locker of example 11 and/or some other example herein, wherein the weighted bar is anchored with the flexible material slot via a second set of pins.

Example 13 may include the locker of example 9 and/or some other example herein, wherein the door slides within the frame between an open position and a closed position.

Example 14 may include the locker of example 13 and/or some other example herein, wherein the flexible material is configured to collapse in the secured position.

Example 15 may include the locker of example 9 and/or some other example herein, where the flexible material distal end is configured to be static.

Example 16 may include a locker configured to store a package, the locker comprising: a series of panels comprising a top panel, a bottom panel, at least one suspended panel, and a plurality of side panels, wherein the at least one suspended panel actuates to secure the package.

Example 17 may include the locker of example 16, wherein the suspended panel comprises a frictional surface.

Example 18 may include the locker of example 17 and/or some other example herein, wherein the frictional surface comprises rubber or foam.

Example 19 may include the locker of example 16 and/or some other example herein, further comprising a door coupled to at least one panel of the series of panels.

Example 20 may include a method for storing a package within a locker, the method comprising: placing the package within a storage compartment; and closing a door to the storage compartment to secure the package, wherein the door and the storage compartment are coupled to a securing component, wherein the securing component comprises a secured position for securing the package within the storage compartment when the door is in the closed position and an unsecured position for removing the package from the storage component when the door is in the open position.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A locker configured to store a package, the locker comprising:
   a storage compartment;
   a door to the storage compartment, wherein the door comprises an open position and a closed position;
   a securing component coupled to the door, wherein the securing component comprises a secured position for securing the package within the storage compartment when the door is in the closed position and an unsecured position for removing the package from the storage compartment when the door is in the open position;
   a frame, wherein the frame comprises a plurality of slots, wherein the door is coupled to the frame;
   a series of panels coupled to the frame, wherein the securing component comprises at least one collapsible panel of the series of panels; and
   a series of pins disposed on the door and the series of panels, wherein the series of pins are configured to interact within at least one slot of the plurality of slots.

2. The locker of claim 1, wherein the frame comprises:
a set of anchor panel slots;
a set of elongated door slots; and
a set of elongated panel slots, wherein at least one door slot and at least one panel slot perpendicularly intersect within the frame.

3. The locker of claim 2, wherein at least one pin on the door guides the at least one pin on at least one panel within at least one slot as the door moves to an open position.

4. The locker of claim 2, wherein the at least one collapsible panel is configured to collapse as the door moves to a closed position.

5. The locker of claim 1, wherein the at least one collapsible panel comprises:
a first portion;
a second portion; and
a flexible hinge coupled to a bottom surface of the first portion and a top surface of the second portion.

6. The locker of claim 5, wherein a first set of pins of the series of pins are disposed on the first portion and a second set of pin are disposed on the second portion, wherein the first set of pins guide the first portion along the at least one slot and the second set of pins are each configured to rotate within an anchor slot.

7. The locker of claim 1, wherein the door comprises a door handle coupled to at least one pin operably disposed within at least one slot.

8. The locker of claim 1, further comprising:
wherein the door is anchored within the frame via a first set of pins; and
a handle coupled to the door,
wherein the securing component comprises a flexible material with a proximate end and a distal end, wherein the proximate end is coupled to the door.

9. The locker of claim 8, wherein the frame comprises a door slot and a flexible material slot.

10. The locker of claim 9, further comprising a weighted bar coupled to the door, wherein the proximate end of the flexible material is coupled to the weighted bar.

11. The locker of claim 10, wherein the weighted bar is anchored with the flexible material slot via a second set of pins.

12. The locker of claim 8, wherein the door slides within the frame between the open position and the closed position.

13. The locker of claim 12, wherein the flexible material is configured to collapse in the secured position.

14. The locker of claim 8, where the flexible material distal end is configured to be static.

* * * * *